Sept. 20, 1960  E. P. GALBA ET AL  2,953,176
APPARATUS FOR HALVING ALMONDS
Filed Jan. 2, 1958  5 Sheets-Sheet 1

EDWARD P. GALBA
ANDREW T. HAMPTON
CLAUDE C. SLATE
FRANK P. SLATE
INVENTORS

BY Lyon & Lyon
ATTORNEYS

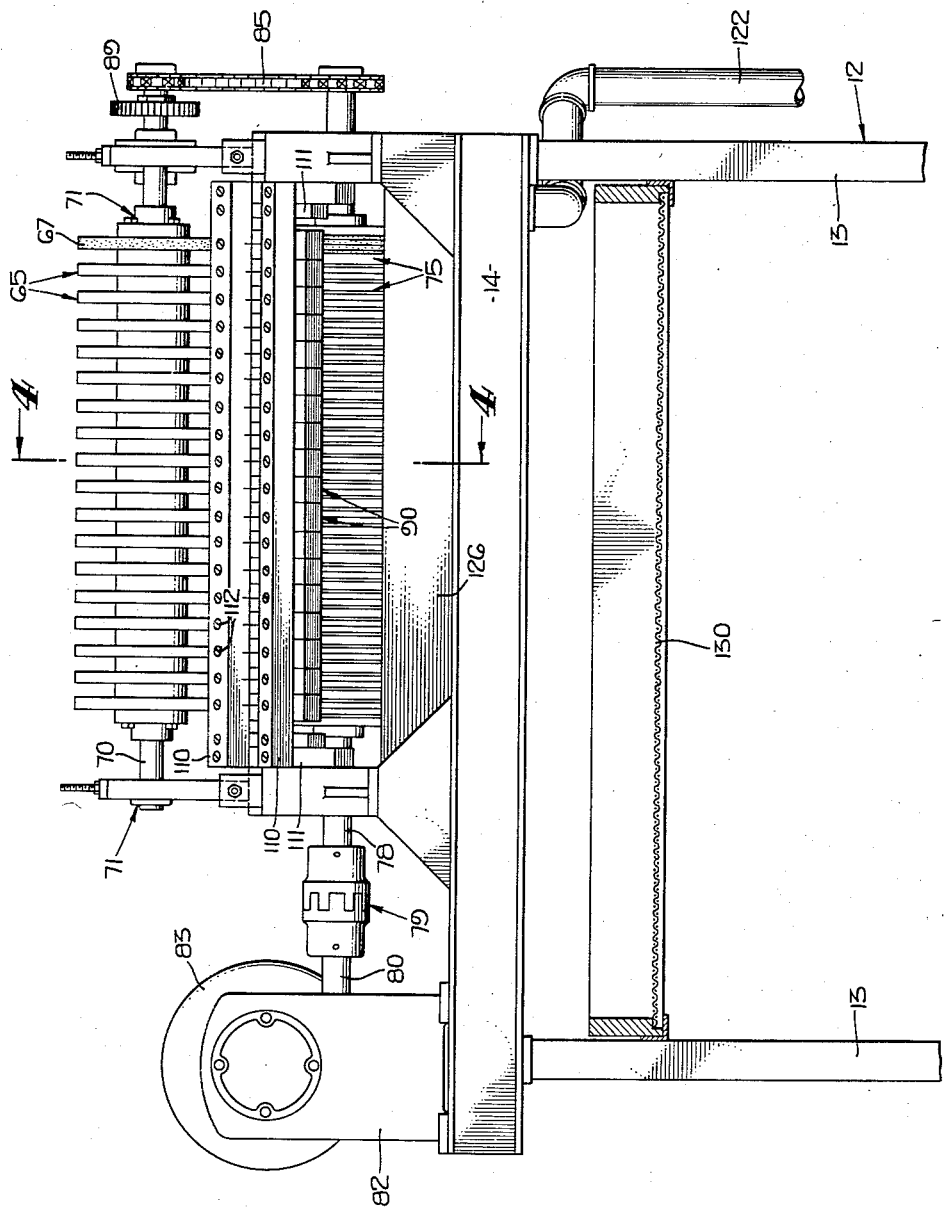

Sept. 20, 1960  E. P. GALBA ET AL  2,953,176
APPARATUS FOR HALVING ALMONDS
Filed Jan. 2, 1958  5 Sheets-Sheet 3
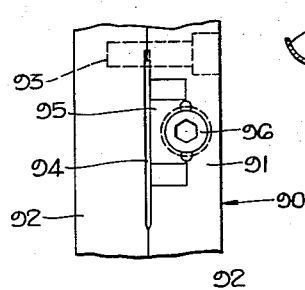
FIG. 9.
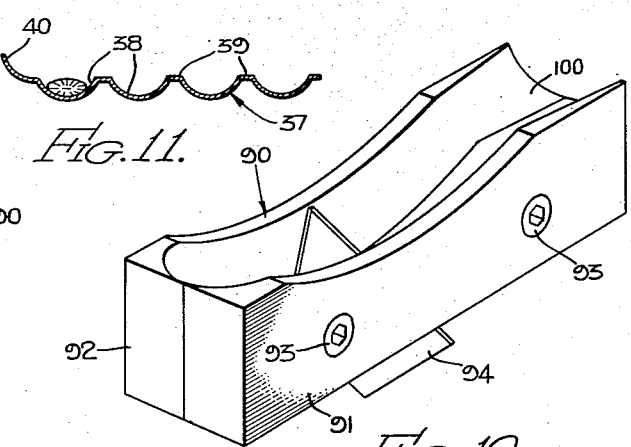
FIG. 11.
FIG. 10.
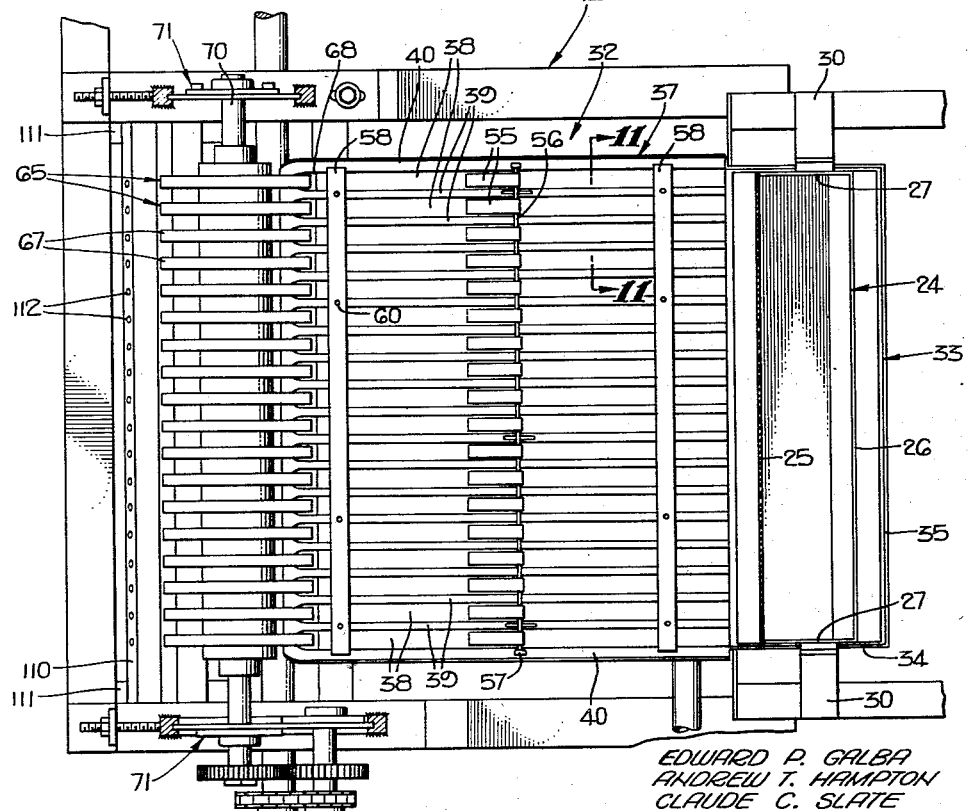
FIG. 3.
EDWARD P. GALBA
ANDREW T. HAMPTON
CLAUDE C. SLATE
FRANK P. SLATE
INVENTORS
BY Lyon & Lyon
ATTORNEYS

United States Patent Office 2,953,176
Patented Sept. 20, 1960

2,953,176
APPARATUS FOR HALVING ALMONDS

Edward P. Galba and Frank P. Slate, Paso Robles, Andrew T. Hampton, Burbank, and Claude C. Slate, Glendale, Calif., assignors to California Almond Orchards, Inc., Paso Robles, Calif., a corporation of California Filed Jan. 2, 1958, Ser. No. 706,753

9 Claims. (Cl. 146—72)

This invention relates to the treatment of almonds and has particular reference to an apparatus for halving almonds.

During the past decade the almond growing industry has made many advances in almond culture, resulting in the production of a greater proportion of large size almonds (less than 30 to the ounce). In some respects this has proven to be disadvantageous since many confection manufacturers, particularly those producing small candy bars, require small nut kernals due to limitations in size of the confection. These manufacturers require almonds that are small enough to be completely enclosed in the confection, but they prefer whole nut kernels to chopped, sliced or broken kernels. The whole kernels promote better keeping quality of the confections due to the lack of any appreciable release of nut oils into the confection, as compared to the kernel fragments which present large cut or broken surfaces from which the oils are readily released.

Many attempts have been made to cut almonds in half longitudinally on a plane at right angles to the natural plane of cleavage of the kernel in order to provide almond particles of the desirable size but presenting a minimum area of cut surface. These attempts have not heretofore been entirely successful in that the cutting operations resulted in a large percentage of waste in slivers, quarters, thirds and other pieces of unacceptable size and excessive cut surface area which could not be used by the confection industry. One of the principal objects of the present invention is to provide an apparatus for halving almonds which is not subject to these and other disadvantages of the prior art.

Another object of the present invention is to provide a novel apparatus for halving almonds on planes substantially normal to the natural cleavage planes of the nuts.

Another object of this invention is to provide an apparatus for halving almonds to produce almond particles of substantially uniform size and having a minimum area of exposed or cut surface, said apparatus being adapted to large scale production with a negligible amount of waste material.

Other objects and advantages of the present invention it is believed will be readily apparent from the following detailed description of a preferred embodiment thereof when read in connection with the accompanying drawings.

In the drawings:

Figure 2 is a sectional elevation taken substantially on the line 2—2 of Figure 1.

Figure 3 is a sectional elevation taken substantially on the line 3—3 of Figure 1.

Figure 9 is a sectional elevation taken substantially on the line 9—9 of Figure 7.

Figure 10 is a perspective view of one of the knife block assemblies.

Figure 11 is a sectional elevation taken substantially on the line 11—11 of Figure 3.

Figure 1:
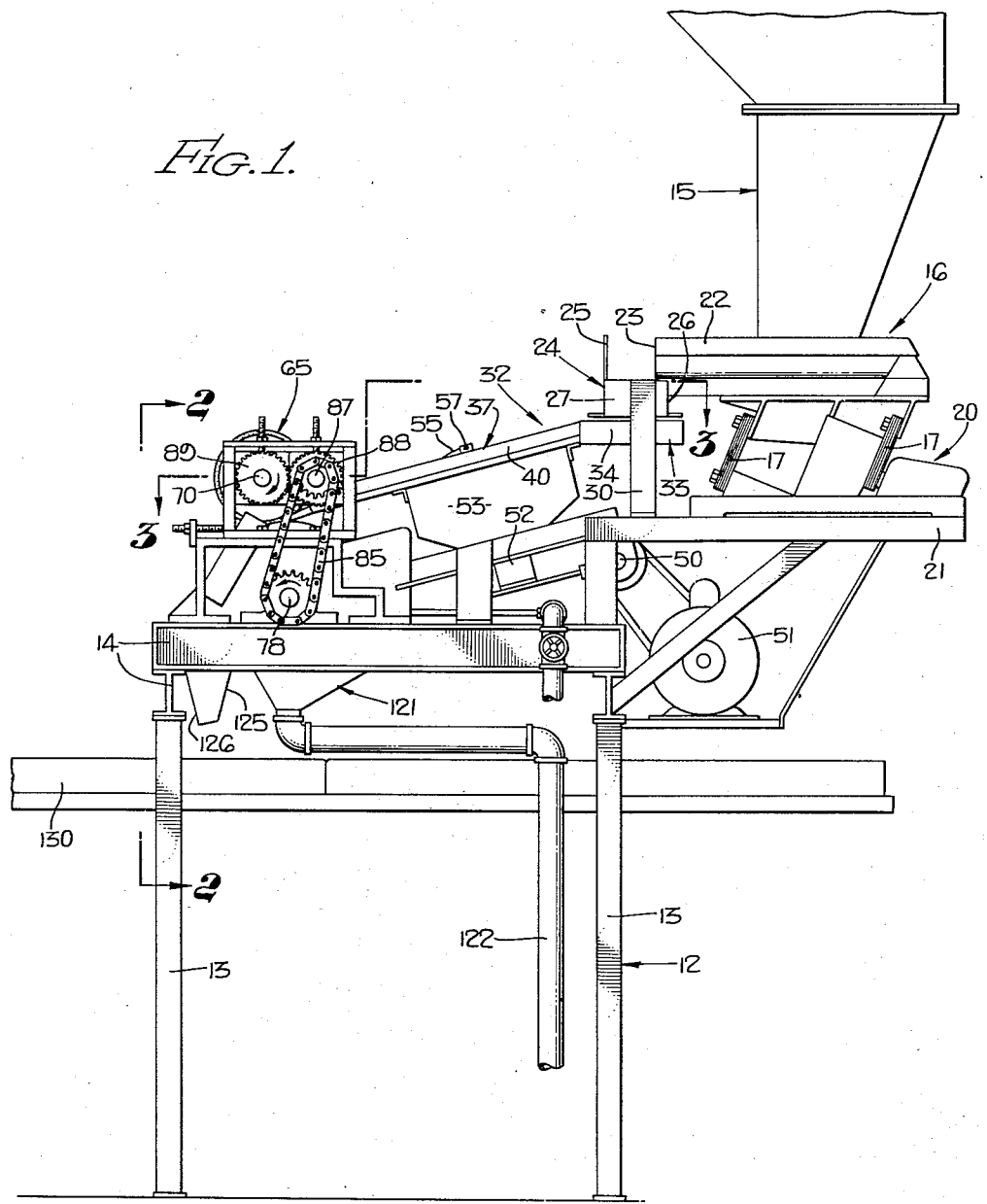
Figure 1 is a side elevation of the apparatus of the present invention.

Referring now to the drawings, the apparatus of the invention includes a framework generally indicated 12 and comprising a plurality of legs 13 and cross beam members 14. A feed hopper 15 for the whole almonds is provided, the hopper being secured to the framework by means not shown. The lower, open end of the hopper is spaced above the horizontal top of a table 16 which is supported on leaf spring members 17 for vibratory motion brought about by an electrical vibrator assembly 20 supported on a framework platform 21.

The table is provided with sides 22 all around except for the front end 23 which is open to permit the almonds to fall off the table under the influence of the vibratory motion imparted thereto. The almonds from the table fall through a stationary rectangular guide member 24 having a front wall 25, a rear wall 26 and side walls 27. The guide member is rigidly connected to the framework by means of vertical bracket members 30.

Operably associated with the guide member is an almond orienter assembly generally indicated 32 and including a horizontal spreader table 33 positioned under the guide member. The table is provided with side walls 34 and a rear wall 35 spaced a very short distance below the lower edges of the guide member side and rear walls 26 and 27.

Connected to the open front end of the table 33 is an inclined orienter 37 comprising a plurality of U-shaped troughs 38 spaced by relatively flat rib portions 39 forming the upper extremities of the troughs. The lateral sides 40 (see Figures 1, 3, and 11) of the orienter are extended upwardly and outwardly a substantial distance to guard against loss of almonds from the orienter. The rear ends of the rib portions 39 are positioned immediately below the front edge of the table 33, the orienter 37 and table being rigidly connected together.

Means are provided to vibrate the orienter 37 and table 33, and as shown in the drawings these means include an eccentric 50 belt-driven by a motor 51 and operably connected to a bracket 52 which in turn is connected to a plate 53 on which the orienter is supported. The eccentric oscillates the orienter in such a manner as to impart a forward impetus to the almonds in the troughs.

The orienter includes means for aligning the almonds in single-depth rows and as shown in the drawings these means include a plurality of fingers 55, one for each of the troughs, swingably connected at one end to a cross-rod 56 mounted transversely above the orienter by means of brackets 57. The other, lower end of each of the fingers extends into one of the troughs as shown best in Figure 4. Auxiliary alignment means include a pair of cross bars 58 extending transversely across the orienter and resting on washers 59 carried on upstanding pins 60.

The pins 60, positioned on spaced ribs 39, extend through oversized apertures in the cross bars 58 so that the cross bars are free to be moved upwardly under influences greater than their own weights.

Means are provided for feeding the almonds from the orienter troughs onto a nut gripping and conveying means. As shown in the drawings, the feeding means includes a plurality of feed rolls 65, one mounted in line with and forwardly of the discharge end of each of the troughs 38. Each feed roll, comprising a wheel portion 66 provided with a rubber or rubber-like ring or tire 67 having a cylindrical periphery, cooperates with a discharge ramp 68, one secured to and leading from the underside of the forward end of each of the troughs. The feed rolls 65 are each keyed to a common cross-shaft 70 mounted for rotation in suitable adjustable bearing assemblies 71 welded to the framework 12.

The gripping and conveying means 75 comprises a plurality of wheels 75a, one mounted directly under each of the feed rolls 65. The wheels are provided with V-shaped peripheries, each forming a seat for a rubber or rubber-like ring 76 having a V-shaped central portion and a pair of radial side flanges 77. The wheels are keyed to the main drive shaft 78 journalled in suitable bearings (not shown) carried on the framework. The shaft 78 is connected by a coupling 79 to the shaft 80 of a gear box 82 driven by a motor 83. A chain transmission 85 extends from the shaft 78 to a stub shaft 87 which carries a gear 88 engaged with a gear 89 on the cross-shaft 70 to drive the shaft 70 and feed rolls in the direction of the arrows of Figures 1 and 4 and opposite to the direction of rotation of the shaft 78 and the wheels 75, but at substantially the same peripheral speeds.

Figure 4:
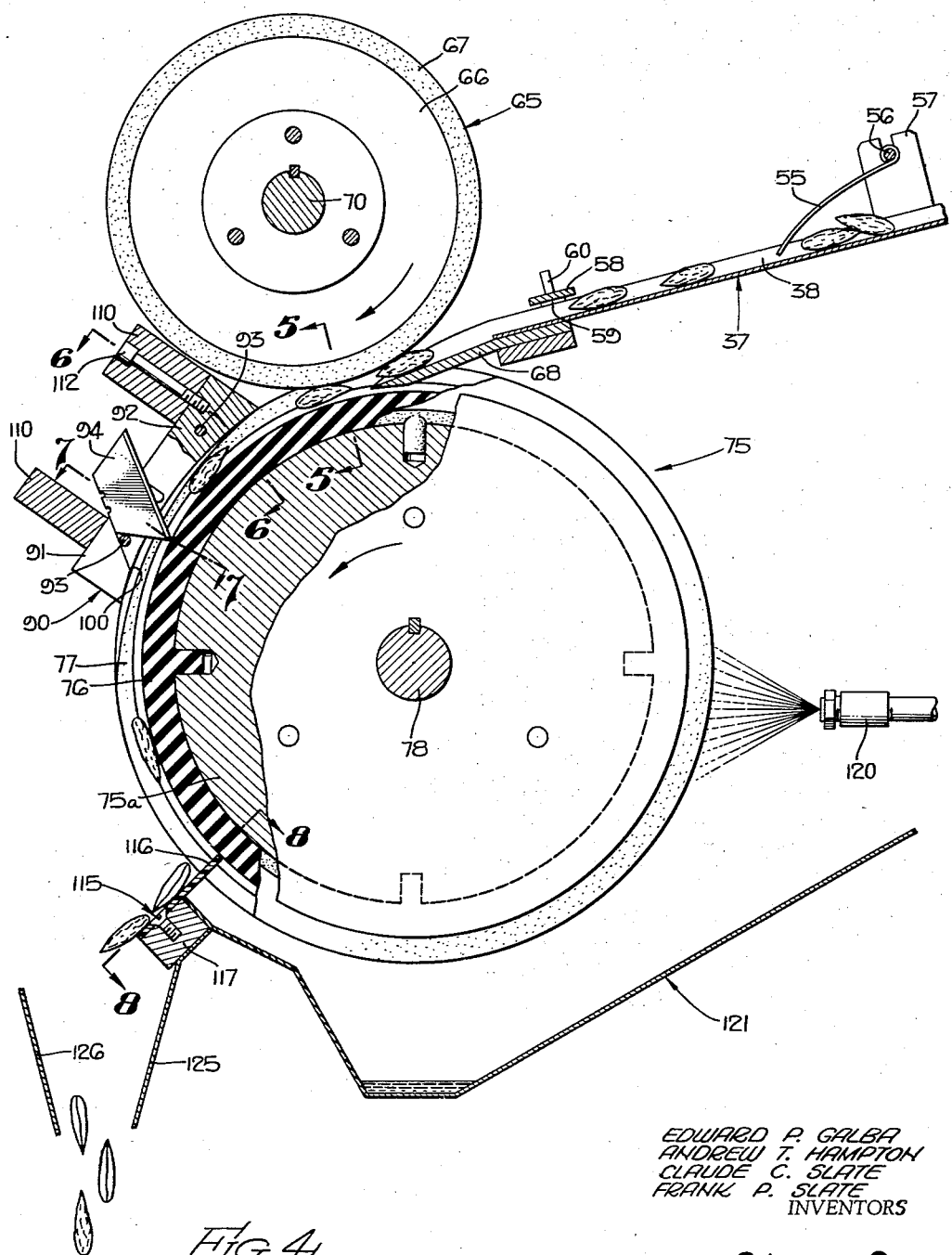
Figure 4 is a sectional elevation taken substantially on the line 4—4 of Figure 2.

It will be noted from an inspection of Figure 4 that the ramps 68 extend into the leading portion of the bite between the feed rolls 65 and wheels 75, each ramp also extending downwardly between the flanges 77 of each of the wheels.

Means are provided for cutting the almonds into halves and as shown in the drawings these means may include the knife block assemblies 90, one for each of the wheels 75. The assemblies 90 are each split longitudinally into halves 91 and 92 connected together by means of screw elements 93. A knife blade 94 is adjustably positioned between the halves 91 and 92 by means of an insert 95 having a planar face bearing against the blade, the half 92 and the insert being tapped for the reception of a screw 96. The block assemblies are each provided with a longitudinal, arcuate groove 100, the longitudinal radius of curvature of the groove bottom being substantially the same as that of the peripheries of the flanges 77. The width of the main portion of the groove is slightly less than the dimension between the external sides of the flanges 77, the forward portion of the groove flaring outwardly so as to lead the flanges thereinto.

The block assemblies are rigidly connected to the framework by means of a pair of bars 110 extending across the framework and secured thereto by means of bracket members 111, the block assemblies being secured to the bars by means of screw members 112.

Means are provided for removing the cut almond halves from the rings 76 and as shown in the drawings these means may include a comb-like member 115 having a plurality of fingers 116, one extending into each of the rings 76. The member 115 is secured to a cross-bar 117 which in turn is secured to the apparatus framework.

The rubber rolls 65 and rings 76 are lubricated by means of water spray nozzles 120, a drain pan 121 and water drain 122 being provided for excess lubricant. The drain pan also includes converging walls 125 and 126 for directing the almond halves onto the product receiver 130 removably mounted therebelow. A suitable conveyor could of course be substituted for the receiver 130.

In operation of the apparatus the almonds to be halved are pre-soaked in water from 2–5 minutes, removed from the water, held in a confined space for several hours to prevent drying and to promote absorption and even distribution of water so that the kernels are in a pliable condition. The kernels are then delivered to the hopper 15 from which they are progressively fed onto the table 16. The almonds move forwardly and fall off the open front end 23 under the influence of the vibratory motion of the table. These almonds are received on the spreader table 33 from which they are vibrated onto the troughs 38 wherein, during the forward movement therethrough they are oriented longitudinally in rows as indicated in Figure 4. The fingers 55 and the alignment bars 58 serve to prevent pile-up of more than one layer of almonds in the troughs.

The almonds proceed from the discharge end of the troughs onto the discharge ramps 68. While the almonds are on the ramps they are contacted by the peripheral edges of the feed rolls 65, the speed of travel of the almonds being thereby accelerated so that the velocity thereof is substantially the same as the peripheral velocity of the wheels 75. Accordingly, the transfer from the vibrating but otherwise stationary ramps to the rapidly moving wheels is accomplished smoothly and without dislodgment of the almonds from the desired longitudinal aspects.

Figure 5:
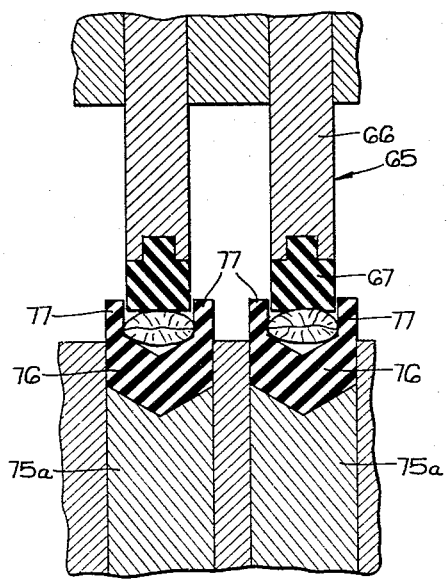
Figure 5 is a sectional elevation taken substantially on the line 5—5 of Figure 4.
Figure 7:
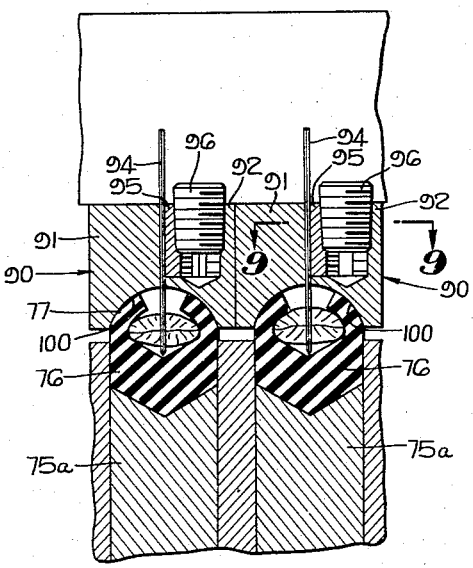
Figure 7 is a sectional elevation taken substantially on the line 7—7 of Figure 4.
Figure 6:
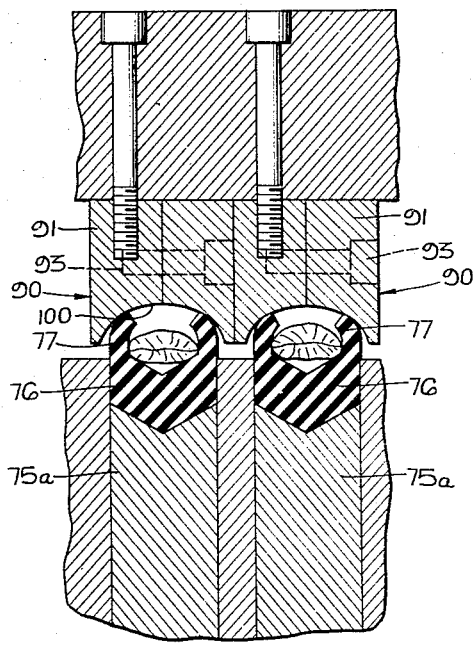
Figure 6 is a sectional elevation taken substantially on the line 6—6 of Figure 4.
Figure 8:
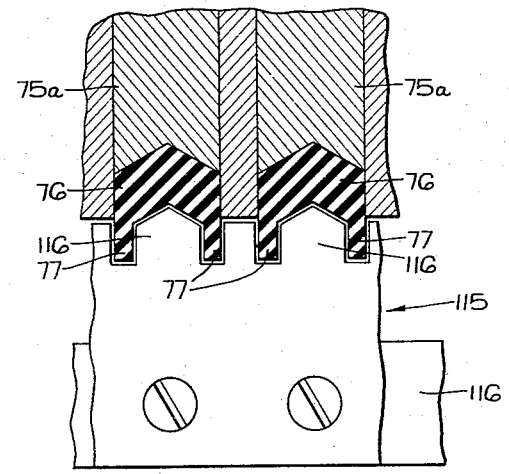
Figure 8 is a sectional elevation taken substantially on the line 8—8 of Figure 4.

The rolls 65 compress the almonds into the grooves formed by the flanges 77 (Figure 5) and the almonds are carried thereby into the knife block assemblies. As shown in Figures 4 and 6, the portions of the flanges conveying the almonds at this stage feed into the block grooves wherein the flanges are distorted as shown in Figure 7 to securely grip the almonds by lateral squeezing forces. The almonds are then brought into contact with the knife blades 94 whereby they are halved, the two halves being expelled from between the flanges, after relaxation thereof by means of the fingers.

Having fully described our invention, it is to be understood that we do not wish to be limited to the details set forth, but our invention is of the full scope of the appended claims.

We claim:

1. In apparatus for halving almonds, the combination of a framework, an orienter assembly on said framework, said orienter assembly including an elongated, inclined trough of U-shaped cross section, means for feeding almonds to said trough, means for vibrating said trough to advance almonds longitudinally therein, means on said framework for gripping and conveying individual almonds, said gripping and conveying means including a pair of spaced, deformable flanges, means for feeding almonds from said trough to said gripping and conveying means, said feeding means including a discharge ramp extending downwardly from the lower end of said trough and a feed roll having a rubber-like peripheral surface moving at a velocity substantially the same as the velocity of the gripping and conveying means, said feed roll being spaced above the discharge ramp in a position to contact almonds thereon, to move said almonds across said ramp and to compress said almonds into the space between said flanges, and cutting means on said framework in a position to halve almonds on said gripping and conveying means.

2. In apparatus for halving almonds, the combination of a framework, an orienter assembly on said framework, said orienter assembly including an elongated, inclined trough of U-shaped cross section, means for feeding almonds to said trough, means for vibrating said trough to advance almonds longitudinally therein, means on said framework for gripping and conveying individual almonds, said gripping and conveying means including a pair of spaced, deformable flanges, means for feeding almonds from said trough to said gripping and conveying means, and cutting means on said framework in a position to halve almonds on said gripping and conveying means, said cutting means including a block having side walls forming a groove, said side walls contacting said flanges to deform them in directions to grip the almonds during the cutting operation.

3. In apparatus for halving almonds, the combination of a framework, an orienter assembly on said framework, said orienter assembly including an elongated, inclined trough of U-shaped cross section, means for feeding almonds to said trough, means for vibrating said trough to advance almonds longitudinally therein, means on said framework for gripping and conveying individual almonds, said gripping and conveying means including a pair of spaced, deformable flanges, means for feeding almonds from said trough to said gripping and conveying means, said feeding means including a discharge ramp extending downwardly from the lower end of said trough and a feed roll having a rubber-like peripheral surface moving at a velocity substantially the same as the velocity of the gripping and conveying means, said feed roll being spaced above the discharge ramp in a position to contact almonds thereon, to move said almonds across said ramp and to compress said almonds into the space between said flanges, cutting means on said framework in a position to halve almonds on said gripping and conveying means, said cutting means including a block having side walls forming a groove, said side walls contacting said flanges to deform them in directions to grip the almonds during the cutting operation, and means for removing halved almonds from said gripping and conveying means.

4. In apparatus for halving almonds, the combination of a framework, means on said framework for gripping and conveying individual almonds, said gripping and conveying means including a pair of spaced, deformable flanges, means for feeding almonds to said gripping and conveying means, cutting means on said framework in a position to halve almonds on said gripping and conveying means, said cutting means including a block having side walls forming a groove, said side walls contacting said flanges to deform them in directions to grip the almonds during the cutting operation, and means for removing halved almonds from said gripping and conveying means.

5. In apparatus for halving almonds, the combination of a framework, means on said framework for gripping and conveying individual almonds, said gripping and conveying means including a pair of spaced, deformable flanges, means for feeding almonds to said gripping and conveying means, cutting means on said framework in a position to halve almonds on said gripping and conveying means, and means for deforming the flanges in directions to grip the almonds during the cutting operation.

6. In apparatus for halving almonds the combination of a framework, means on said framework for gripping and conveying individual almonds, said gripping and conveying means including a wheel carrying a peripheral rubber-like ring having a pair of spaced, deformable flanges, means for feeding almonds to said gripping and conveying means, cutting means on said framework in a position to halve almonds on said gripping and conveying means, and means for deforming the flanges in directions to grip the almonds during the cutting operation.

7. In apparatus for halving almonds, the combination of a framework, an orienter assembly on said framework, said orienter assembly including an elongated, inclined trough of U-shaped cross section, means for feeding almonds to said trough, means for vibrating said trough to advance almonds longitudinally therein, means on said framework for gripping and conveying individual almonds, said gripping and conveying means including a wheel carrying a peripheral rubber-like ring having a pair of spaced, deformable flanges, means for feeding almonds from said trough to said gripping and conveying means, cutting means on said framework in a position to halve almonds on said gripping and conveying means, and means for deforming the flanges in directions to grip the almonds during the cutting operation.

8. In apparatus for halving almonds, the combination of a framework, an orienter assembly on said framework, said orienter assembly including an elongated, inclined trough of U-shaped cross section, means for feeding almonds to said trough, means for vibrating said trough to advance almonds longitudinally therein, means on said framework for gripping and conveying individual almonds, said gripping and conveying means including a pair of spaced, deformable flanges, means for feeding almonds from said trough to said gripping and conveying means, said feeding means including a discharge ramp extending downwardly from the lower end of said trough and a feed roll having a rubber-like peripheral surface moving at a velocity substantially the same as the velocity of the gripping and conveying means, said feed roll being spaced above the discharge ramp in a position to contact almonds thereon, to move said almonds across said ramp and to compress said almonds into the space between said flanges, cutting means on said framework in a position to halve almonds on said gripping and conveying means, and means for deforming the flanges in directions to grip the almonds during the cutting operation.

9. In apparatus for halving almonds, the combination of a framework, means on said framework for gripping and conveying individual almonds, said gripping and conveying means including a pair of spaced, deformable flanges, means for feeding almonds from said trough to said gripping and conveying means, said feeding means including a discharge ramp extending downwardly from the lower end of said trough and a feed roll having a rubber-like peripheral surface moving at a velocity substantially the same as the velocity of the gripping and conveying means, said feed roll being spaced above the discharge ramp in a position to contact almonds thereon, to move said almonds across said ramp and to compress said almonds into the space between said flanges, and cutting means on said framework in a position to halve almonds on said gripping and conveying means.

References Cited in the file of this patent

UNITED STATES PATENTS

| Number | Name | Date |
|---|---|---|
| 553,649 | Harpold | Jan. 28, 1896 |
| 2,506,117 | Stiefvater | May 2, 1950 |
| 2,670,498 | Mosby | Mar. 2, 1954 |
| 2,699,806 | Gardner | Jan. 18, 1955 |
| 2,745,453 | Perrelli et al. | May 15, 1956 |